June 30, 1953  I. I. SIKORSKY  2,643,724
HELICOPTER ROTOR
Filed Feb. 21, 1947  3 Sheets-Sheet 1

AUTOROTATION POSITION  NORMAL POWER-ON

IGOR I. SIKORSKY
INVENTOR
BY Charles L. Shelton
ATTORNEY

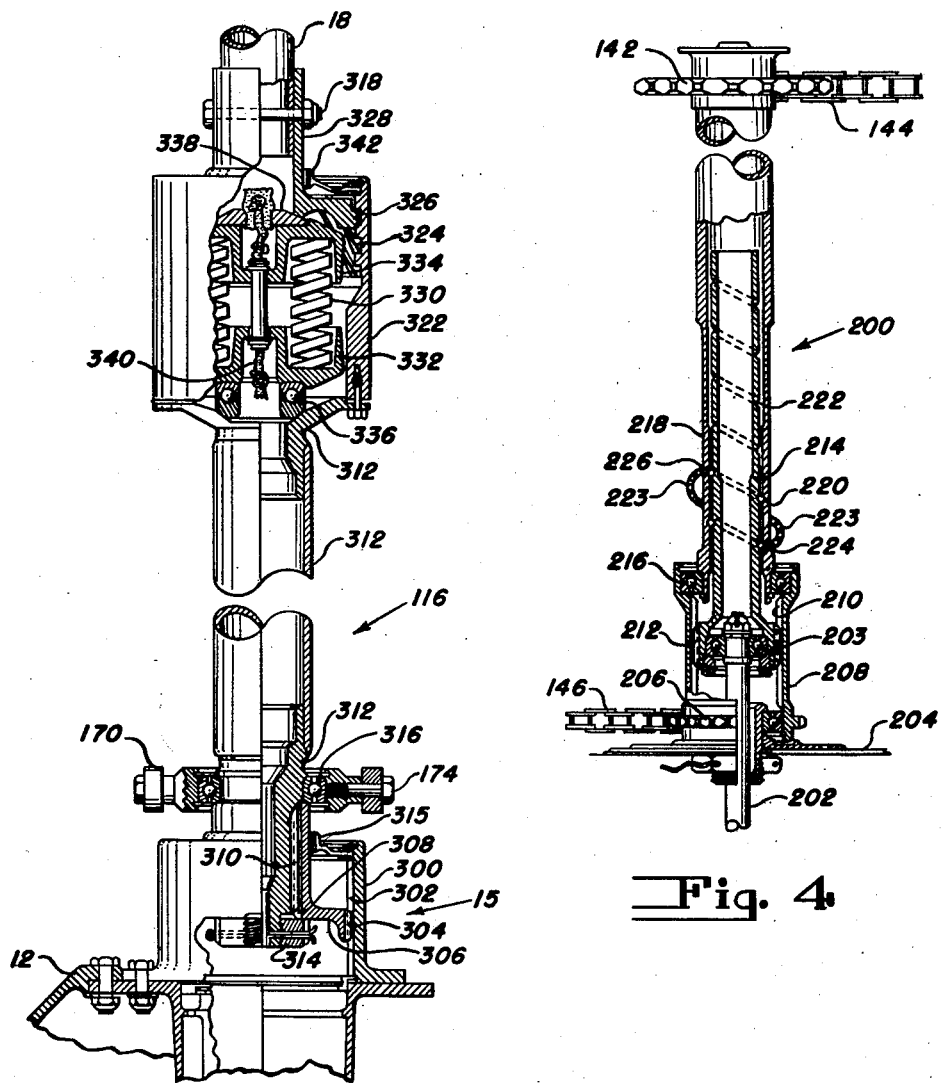

June 30, 1953 I. I. SIKORSKY 2,643,724
HELICOPTER ROTOR

Filed Feb. 21, 1947 3 Sheets-Sheet 3

IGOR I. SIKORSKY
INVENTOR

BY Charles L. Shelton
ATTORNEY

Patented June 30, 1953

2,643,724

UNITED STATES PATENT OFFICE 2,643,724

HELICOPTER ROTOR

Igor I. Sikorsky, Bridgeport, Conn., assignor to United Aircraft Corporation, East Hartford, Conn., a corporation of Delaware Application February 21, 1947, Serial No. 730,049

3 Claims. (Cl. 170—135.72)

This invention relates generally to improvements in rotary wing aircraft; and more particularly to improved control mechanism, wherewith certain control functions presently performed manually are performed mechanically and instantaneously, and wherewith aerodynamic damping is rendered available without loss of stability or safety in the aircraft; and specifically to improved automatic pitch control mechanism responsive to torque requirements of the lifting rotor, or rotors.

It has been found that the torque requirements of a helicopter rotor bear a definite relationship to the lift of the rotor and also to the torque capacity of an internal combustion engine of the type commonly used in aircraft. Further, it has been found that the ratio of the angle of incidence of a rotor blade to the torque required to turn the blade at different angles of incidence is substantially a linear function within limits useful in helicopters. Inasmuch as the spring rate of torsion springs is substantially linear within the normal operating range of such springs, it is now found possible to balance with such springs, or the like, the linearly variable torque between the engine and the rotor to obtain a substantially self-contained, automatically balanced pitch control mechanism for helicopter lifting rotors.

Automatic aerodynamic damping has also been long recognized as desirable in helicopters. However, with presently known structures having automatic control of the pitch of the lifting rotors upon application of torque, the pitch must increase with the increase of torque. The operation is generally as follows: As more torque is applied, the blade drags back around the vertical hinge, and the pitch increases, and as torque is reduced the blade moves ahead about the drag hinge and the pitch decreases. This result may be produced by a variety of means such as real inclined drag hinges, or by virtual inclination of hinges (i. e., the hinge itself, is vertical but the controls are so joined that as the blade moves about the drag hinge the pitch changing linkage operates to change the blade pitch, for example).

With the above in mind, it can be readily observed that the direction of pitch change for response to torque, which is in proportion to drag of the blades, is exactly opposite to the pitch change required for aerodynamic damping. For natural aerodynamic damping and stability it is desirable to have the blade decrease its pitch as it lags back and increase its pitch as it moves forward. This principle has often been suggested but it cannot actually be applied to a helicopter where the principal lag-lead motions of the blade are caused by the application of varying amounts of torque.

Without using a governor, it is possible with the present structure to render the rotor fully automatic with regard to the pitch-torque requirements and at the same time to combine the features of aerodynamic damping and stability to the individual blades. In this way strains upon the structure associated with mechanical or hydraulic dampers may be considerably reduced or entirely eliminated.

It has been said that the helicopter is more difficult to fly than the conventional aeroplane. However, by simplifying the controls of a helicopter by the elimination of the total pitch control, it is possible to obtain synchronous and automatic operation of the main pitch of the rotors upon movement of the throttle. This will eliminate one control and make the helicopter the easiest and safest type of aircraft to operate. Heretofore, it has been common practice, as described in my patents, Nos. 2,318,259 and 2,318,260, to manually operate a main pitch control and to have the engine throttle synchronized with the main pitch. This method, it is believed, has been used on all production helicopters, to date. This type of control has required the use of both hands of the pilot in take-off and other maneuvers and has made it difficult for the pilot to operate the radio, hydraulic hoist and other devices which require separate controls. With the present device, the pilot can set the throttle for any desired engine output and be concerned with the cyclic control, or joystick, only. Furthermore, this type of throttle could easily be of the foot pedal type, or, if necessary, it could be mounted on the joystick for operation by the same hand which operated the cyclic controls.

My improved structure includes an adjustable connection in the drive shaft of a helicopter, which connection responds to torque of the engine or rotor to change the pitch of the rotor in a direction to absorb the full power of the engine. Thus, when the engine throttle is opened, the increase in power will increase the pitch of the rotor blades in substantially exact proportion to absorb the full torque output, and the engine-rotor system can be adjusted to maintain the optimum fuel efficiency during power operation. In the event of power failure, a spring mechanism, or equivalent, will operate instantly to move all the rotor blades of the rotor simultaneously to the auto-rotative attitude without the requirement for manual actuation, thus rendering the helicopter free of the possibility of pilot's error such as failure to reduce main pitch quickly when shutting off the engine in flight or by suddenly increasing the main rotor pitch and thereby possibly causing the engine to stall. The mechanism providing aerodynamic damping can operate during either power-on or auto-rotation to thus further improve the character and quality of operation of the helicopter.

Accordingly, it is an object of my invention to provide improved automatic mechanism for controlling the pitch of a rotor for rotary wing aircraft.

Another object is to provide an improved rotor drive and control system wherewith aerodynamic damping is used, and the structure for obtaining the same.

A further object is to simplify and reduce the number of controls of a helicopter to the same number and type of controls that are common on fixed wing aircraft; namely, a joystick, rudder pedals and throttle, and a trimming device.

Other objects, features and advantages reside in the details of construction and the arrangement of parts, and will be either pointed out or obvious in the following specification and claims.

In the drawings,

Fig. 4 is a detailed partial sectional view of a control jack;

Fig. 5 is a detail elevational view, with parts in section, of the yieldable torque responsive portion of the drive shaft;

Figures 1, 2, 3:
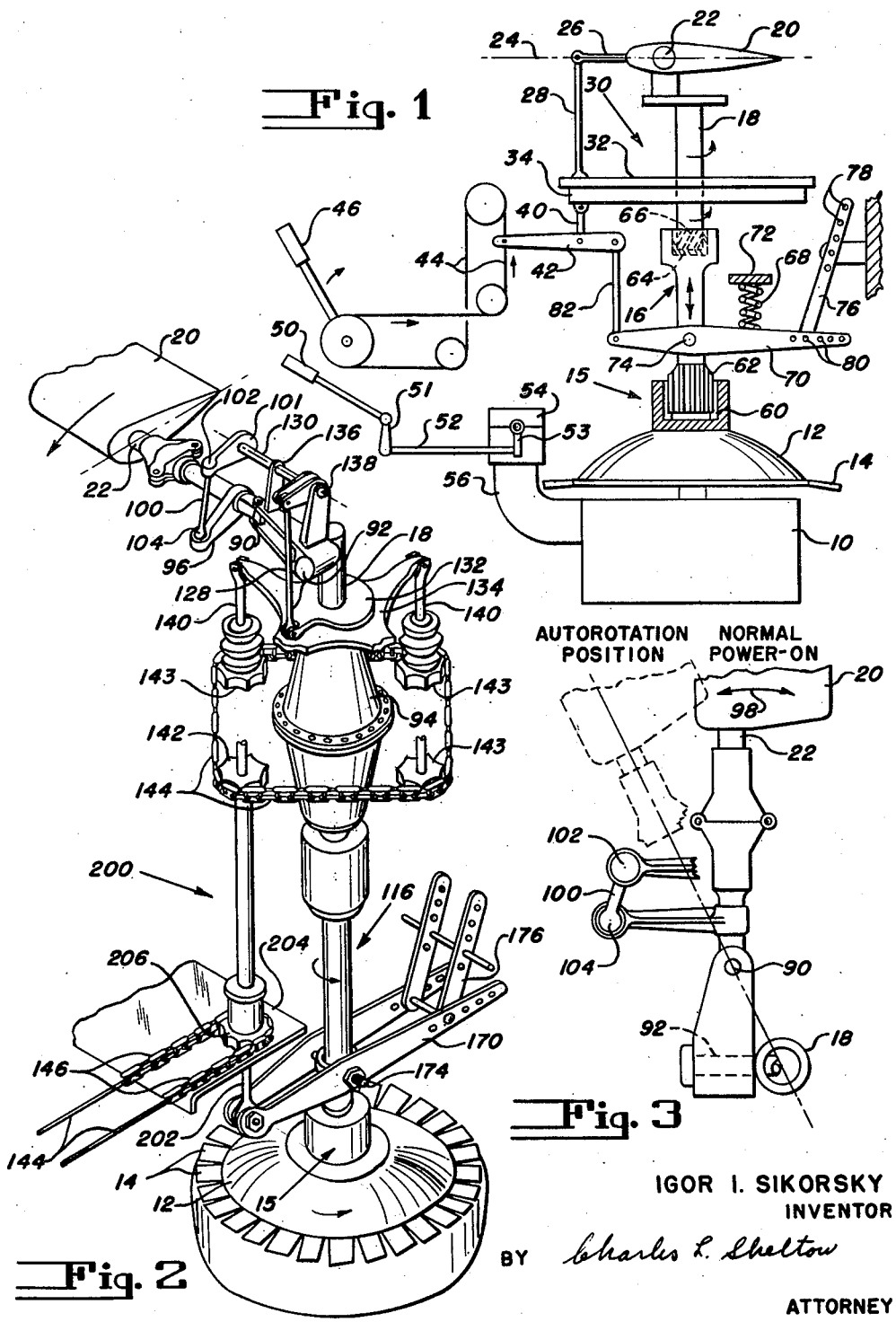
Fig. 1 is a diagrammatic view of parts arranged to illustrate the function of the invention.
Fig. 2 is a diagrammatic perspective view of a presently preferred form of the invention.
Fig. 3 is a partial plan diagrammatic view of Fig. 2.

Referring to Fig. 1, an air cooled engine 10 drives a rotor blade 20 through an overrunning clutch contained within the rotating housing 12. A fan 14 is mounted on the periphery of housing 12 to direct cooling air over the engine. On the upper portion of the housing 12 is splined connection 15 for driving torque responsive member 16 which in turn rotates an upper axially fixed drive shaft 18 that is connected to the variable pitch rotor blade 20 through drag and flapping hinges (not shown). The pitch of the rotor blade 20 is controlled in the arrangement shown in Fig. 1 by a control horn 26 which connects with a push-pull rod 28 connected to a tilt plate mechanism. The tilt plate mechanism 30 is made up of a pair of relatively rotatable members 32 and 34. The member 32 is connected with the drive shaft 18 through a universal joint (not shown) and rotates therewith. The member 34 may be maintained non-rotatable with a suitable connection to the helicopter fuselage (not shown). The members 32 and 34 may be connected together for conjoint tilting or up and down movement by ball bearings interposed therebetween in any conventional manner.

The tilt plate mechanism 30 may be moved up and down by a plurality of push-pull rods 40, only one of which is shown. The rod 40 connects by a pivot at its upper end to the member 34 and at its lower end by a pivot to a floating link 42 at some point between the ends of the link 42, which point may be best determined by particular requirements in different ships.

The left hand end of the floating link 42 may be moved up and down by cables 44 suitably guided upon pulleys by means of a manual pitch control lever 46 which is in the cockpit of the helicopter. The lever 46 may be used in this invention for trimming the controls which are operated automatically and now to be described.

A throttle control 50, adjacent the pilot's seat, connects through links 51, 52 to a throttle valve arm 53 on carburetor 54 which meters the fuel charge to intake manifold 56 on the engine 10. An increase in the air fuel mixture to the engine will cause a corresponding increase in the horsepower output which will tend to increase the speed of the rotor. However, an increase in speed causes an increase in drag and therefore the increased horsepower increases the torque absorbed by the rotor. The increase in torque acts through the torque responsive member 16 to increase the pitch of the blades, in a manner now to be described, which in turn will tend to stabilize the speed of the rotor.

The drive connection 15 has internal straight splines 60 which mate with the straight splines 62 on the lower end of member 16. The upper end of member 16 has spiral splines 64 which mate with spiral splines 66 on the lower end of shaft 18. The pitch of the spiral splines 64 and 66 is such that an increase in torque will cause the spline 64 to ride upward on the spline 66. Thus, upon an increase in torque the member 16 will ride upward on splines 66. Frictional resistance associated with the spiral splines may be reduced by substituting ball races for the splines if desired.

Upward motion of the member 16 is resisted by a compression spring 68 carried between a rod 70 and a portion of the fuselage 72. The arm 70 is pivotally mounted upon a pin 74 which is carried upon bearings surrounding the member 16 to permit relative rotation between the arm 70 and the member 16 but connecting the two for axial movement together. The right hand end of the arm 70 is carried in a sling 76 which is pivoted by different adjustment holes 80 upon the arm 70. With such adjustment it is possible to change both the leverage of the arm 70 and its position of control to provide for pitch adjustment between the rotor blades and the engine. In this way, the system may be adapted to sets of blades that may have different airfoils and thus differ in aerodynamic characteristics, and to the normal variation between production engines.

Vertical movements of the arm 70 in response to torque cause up and down movements of the push-pull rod 82 that is connected to the floating link 42 at its upper end. Accordingly, it is seen that with a change in torque of the engine 10 the pin 74 will be moved up and down to rock the arm 70 around its pivot point 80 against the bias of the spring 68 to raise or lower the tilt mechanism 30 to change the pitch and hence the lift of the blade 20. It will thus be evident that link 42 comprises a differential element movable to vary the collective pitch of the rotor blades as a result of movement of lever 46 or torque responsive arm 70.

Referring now to Fig. 2, pivot mounts for the blade 20 and a slightly modified control mechanism are shown, which structure performs substantially the same function as that mechanism described in connection with Fig. 1. The blade 20 is mounted upon a spar 22 which in turn is mounted upon a drag hinge 90 that permits the blade 20 to have lag-lead (hunting) movements in its plane of rotation as it rotates. A flapping hinge 92 permits the blade 20 to flap and cone in response to aerodynamic and centrifugal forces as it rotates. The shaft 18 extends downwardly through a suitable gear reduction mechanism 94 to a torque responsive mechanism 116.

Axial movement of the rotating swash plate 132 in response to manual or automatic controls will act through the push-pull rod 128 to rotate torque tube 130, mounted in bearings 136, 138 to rotate crank 101. Movement of crank 101 will act through push-pull rod 100 to rotate control horn 96 which is connected to the spar 22 and will move blade 20 in a pitch increasing or pitch decreasing direction. The spar 22 has internal radial thrust bearings to permit of pitch change, and for details of construction thereof reference may be had to Patent No. 2,529,635, issued November 14, 1950.

As the blade 20 moves back and forth around the pivot 90, as indicated by the arrow 98, Fig. 3, push-pull rod 100 will rotate about a ball joint 102 at its upper end in a direction to vary the pitch of the blade 20 by rocking the rod 100 around a second ball joint 104 on the lower end of the rod 100. Motion to the right of the blade 20 will cause the ball 104 to swing downwardly on an arc underneath the ball joint 102 which will cause a decrease in pitch of the blade 20. Inasmuch as such lagging movement is usually due to excess drag of the blade 20, the decreased pitch will cause a reduction in drag and hence permit the blade to move forwardly again under the influence of centrifugal force. Blade motions to the left (i. e., in the direction of rotation of the rotor) will cause an opposite rotation of the push-pull rod 100 and cause a pitch increase of the blade 20 and hence an increase in drag. The above action is conveniently called aerodynamic damping because a given motion causes an aerodynamic change in action of the part moved in the air in a manner to correct for a disturbing force. When the blade moves forward into the auto-rotative position (shown in dotted line in Fig. 3) the pitch increase due to the aerodynamic damping function will be of small magnitude and will be offset and overriden by the pitch decrease caused by the torque responsive mechanism.

The axial movement of the swash plate 132 is transmitted thereto by the stationary swash plate 134. The position of swash plate 134 is controlled through jackscrews 140, the details of which form no part of this invention but may be seen in the above-mentioned U. S. Patent No. 2,529,635, which move up and down in response to rotation of the sprockets 142 and 143 by means of the chain 144. As shown here, the chain and sprocket arrangement controlling the jackscrews 140 controls only the total pitch of the blades. For the sake of clarity, the chain and sprocket controls for cyclic pitch have been omitted but may be of the type shown in the aforementioned patent. Movement of the chain 146 by means of manual controls will act through the sprocket and worm device 200 to rotate the sprocket 142 on the upper end thereof. Rotation of sprocket 142 will rotate sprockets 143 to raise or lower swash plates 132, 134 axially of shaft 18 to change the pitch of the blade 20.

The sprocket and worm device 200 is mounted on a stationary part of the helicopter such as the plate 204 and has a sprocket 206 on the outside of the lower portion thereof. Rotation of the sprocket 142 on the upper end of the control jack 200 may also be obtained through vertical movement of the rod 202 which is connected to a tubular member 214 (see Fig. 4) through bearings 203. The sprocket 206 is integral with the outer casing 208. The casing 208 has internal straight splines 210 engaging the splines 212 which are integral with the tubular member 214. Mounted in bearings 216 is an outer tubular member 218 which has sprocket 142 on its upper end. On the inside of the tubular member 218 are half ball races 220 for a number of revolutions which cooperate with half ball races 222 cut in the outer surface of the tubular member 214. Cooperating with and completely filling the ball races 220 are ball bearings which greatly decrease the friction in this device. On the outside of the tubular member 218 is a ball return 223 extending from tap hole 224 to tap hole 226. The ball race 220 on external member 218 is only cut between the tap holes 224 and 226. The ball return 223 serves to return the ball bearings from hole 224 to hole 226 as the balls are forced out of hole 224 as a consequence of movement of the tubular members and vice versa when the movement of the tubular members is in the opposite sense. The pitch of the ball races is such that rotation of the casing 208 will act through the splines 210, 212 to rotate the inner tubular member 214 and consequently rotate the outer tubular member 218 therewith. It should be noted that rotation of the inner tubular member 214 will not cause any motion of the rod 202 since the bearing 203 is interposed between the parts. Axial movement of the inner member 214, imparted thereto by vertical movement of the rod 202, will also act to rotate the outer tubular member 218 but will not rotate the casing 208.

It is apparent, therefore, that movement of the chain 146 through manual pitch control means operated by the pilot would act through splines 210, 212 to rotate the tubular members 214, 218 conjointly and therefore rotate the sprocket 142 to change the pitch of the blade 20. It will also be apparent that axial movement of the rod 202 in response to the torque applied to the blades will act to rotate the tubular member 218 and sprocket 142 for pitch changing movement of the blade. Thus the sprocket and worm device 200 in Fig. 2 is the equivalent of the differential element 42 in Fig. 1.

The vertical movement of the rod 202 is a result of an increase or decrease in the torque transmitted through the torque responsive device 116. As the device 116 moves vertically in response to torque, the movement is transmitted through pins 174 to the arms 170 which are connected at one end to rod 202 and at the other end to sling 176 which is pivoted on a stationary part of the helicopter. The arm 170 and the sling 176 have various adjustment holes which serve to adapt the system to various conditions.

As may be seen in Fig. 5, the housing 12 containing the over-running clutch, the details of which form no part of this invention, drives the torque responsive device 116 through the connection generally referenced 15. The annular member 300 is bolted on housing 12 and has internal splines 302 which engage splines 304 on an intermediate member 306. The intermediate member 306 has splines 308 which engage splines 310 on the composite member 312 and is held against axial movement with respect to the composite member 312 by means of lock nut 314 on the bottom of composite member 312 which holds the intermediate member 306 in contact with bearing 316. The bearing 316 is provided to permit arms 170 to remain stationary while the composite member 312 rotates. A dust and oil seal 315 is provided between the top of casing 309 and intermediate member 306 and permits sliding movement between the parts. Thus it may be seen that the splined drive connection 15 affords a convenient assembly of relatively simple parts.

The composite member 312 is fabricated by means of welds from a number of parts which permit of easy construction. The member 312 drives an annular member 322 which has spiral splines 324 on the upper inner surface thereof. Engaging these spiral splines 324 are cooperating spiral splines 326 on member 328. The member 328 drives shaft 18 and is connected therewith by means of a keyed connection 318. It will be evident that power is transmitted from annular member 300 to shaft 18 through the intermediate splined member 306, composite member 312, and thence to member 322 where the internal spiral splines 324 cooperate with and drive the splines 326 on the member 328.

Obviously, if a resistance force were not provided, the spiral splines would ride up on splines 326 to the full limit. Compression springs 330 are provided for this purpose and are held in place by means of members 332, 334. The member 332 is mounted upon bearings 336 and member 334 bears against member 338. Lubrication for the bearing 338 is supplied through the lubricating wick 340, one end of which is immersed as is bearing 336 in a suitable supply of oil, not shown. Since the members 332, 334 are mounted in bearings in this fashion the upper ends of the springs 330 will not rotate relative to the lower ends. Between the top of annular member 322 and member 328 is a slidable dust and oil seal 342.

When the torque transmitted through member 116 is increased, the internal spiral splines 324 will ride up on the external spiral splines 326 on member 328. Since the splines 302, 304 in the lower portion are straight, such axial movement is possible. However, the compression springs 330 will resist any upward movement of the spiral splines. As pointed out hereinbefore, the torque absorbed in the rotor bears a definite relationship to the lift of the rotor and to the torque of an internal combustion engine. Therefore, the axial movement of the torque responsive device 116 may be utilized as a measure of the required pitch angle, and is conveniently transmitted by means of pins 174 and arms 170 to the rod 202 to vary the pitch of the blade 20 as the torque is varied.

Should the friction in the spiral splines reach an undesirable value, it may be reduced by any of the well-known expedients. For example, cooperating half ball races or a cam and roller may be used and, in the latter instance, the contour of the cam track may be varied to vary the operating characteristics of the torque responsive member where desired.

The diagrammatic representation of my invention in Fig. 1 shows separate control sticks for total pitch and throttle. These controls, however, may conveniently be combined into one dual purpose stick which serves to control the throttle or pitch as shown in Figs. 6 and 7.

Figure 6:
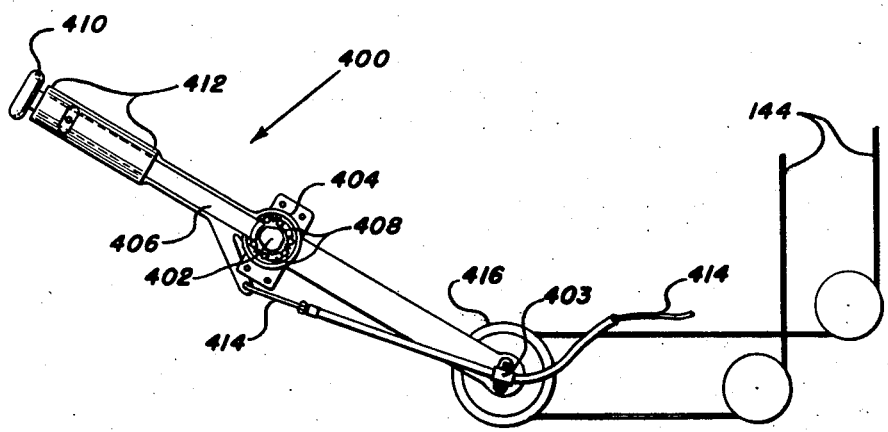
Fig. 6 is a detailed side view of a dual purpose throttle and pitch control stick.
Figure 7:
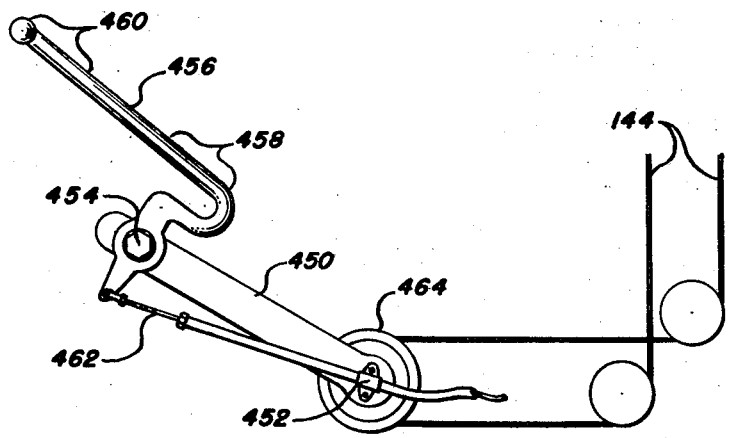
Fig. 7 is a modification of the throttle and pitch stick.

Fig. 6 shows a control arm 400 which is pivoted about two pivots 402, 403. On the periphery of the pivot 402 are inclined surfaces. Between the inclined surfaces on the pivot 402 and the outside member 404 are spring biased ball bearings which normally wedge between the outer member 404 and the inclined surfaces. As may be seen in the drawing, the internal shaft 406 has portions 408, integral therewith, interposed between pairs of the spring biased ball bearings. A loose fit allows slight movement of portions 408, and the end of shaft 406 near the pivot is an arcuate path having the pivot as a center. This slight movement is sufficient, however, to dislodge the balls which are wedged between the inclined surfaces and the inside surfaces of member 404. It will now be apparent that force applied at knob 410 on the outer end of shaft 406 will move the other end of shaft 406 and portions 408 to dislodge the balls and permit rotation about pivot 402. However, should the arm 400 be grasped in the region denoted by numeral 412, the ball bearings will remain wedged between the pivot 402 and the outer member 404. When this condition obtains, rotation will be about the pivot 403.

Offset from the pivot 402 is a connection to throttle cable 414 which controls the position of the throttle arm on the carburetor. It should be noted that cable 414 passes through the axis of pivot 403. Therefore, when rotation is about pivot 403 there will be no change in the throttle setting. Pitch control cable 144 is wrapped around a pulley 416 which is adapted for rotation around pivot 403 when stick 400 is rotated thereabout. The pitch cable 144 is connected to chain 146 to rotate the lower sprocket in the sprocket and worm device 200 (Fig. 2).

In operation, the pilot may control the throttle separately by moving the knob 410 to cause rotation of the arm 400 about the pivot point 402. Through the torque responsive device (described supra) an increase or decrease in the throttle, causing an increase or decrease in torque, will act to change the pitch of the blade 20. However, should the pilot desire to trim the pitch, he may do so by grasping the arm 400 in the region 412 to cause rotation about the pivot 403.

Fig. 7 shows another method of making a dual purpose control stick. In this modification, an arm 450 is pivoted at one end about point 452 and has at its other end a pivot 454. Mounted on pivot 454 is an arm 456. If the pilot should grasp the arm 456 in the region 458, the force would all be transmitted directly through the pivot 454 so that there will be no rotation about pivot 454 but there will be rotation about the pivot 452. However, if the force should be applied at 460 there will be a moment arm about the pivot 454 and the rotation will be about this pivot only.

A throttle control cable 462 is attached to a depending portion of the arm 456 and passes through the axis of pivot 452. The pitch control cable 144 rides on pulley 464 which is adapted to rotate about pivot 452 conjointly with the arm 450. The pilot may vary the pitch by applying force in the region 458 which will allow rotation about the pivot 452 and consequently move the pitch control cable 144. The throttle may be adjusted by applying force in the region 460 which will cause the rotation to be about the pivot point 454 and move the throttle cable 462.

*Operation*

Under all normal conditions the pilot need concern himself only with throttle setting. Upon setting the throttle in a given position, the torque applied to the rotor blades through the torque responsive device 116 will assume a value consistent with the characteristics of the particular rotor utilized. Should the throttle be increased from this position, the torque transmitted will be correspondingly increased. The increase in torque will cause the splines 324 to ride up on the spiral splines 326 to an amount determined by the characteristics of the compression springs 330. This upward motion of the torque responsive device will be transmitted to arms 170 through pins 174 and will cause the rod 202 to move upward. The vertical movement of the rod 202 will be transmitted into rotational movement of the outer tubular member 218 of the control jack 200 through the ball races 220, 222. The rotation of the outer tubular member 218 will rotate sprocket 142 which engages chain 144; and will, therefore, rotate all the other sprockets 142 a corresponding amount. This rotation of the sprockets 142 will act through jackscrews 140 to move the stationary swash plate 134 and the rotary swash plate 132 upwardly to cause an increase in the pitch of the blade 20. Thus it may be seen that an increase in the throttle setting will cause a corresponding increase in the pitch of the rotor blade.

Should the throttle setting now be decreased, the compression springs 330 will force the splines 324 downwardly with respect to the spiral splines 326. This downward motion will be transmitted through the arms 170 to the rod 202 which will also be moved downwardly. The downward motion of the rod 202 will act through the control jack 200 to rotate the chain 144 in an opposite direction to increase the pitch in an amount corresponding to the decrease in throttle.

Under all operating conditions (both power-on and power-off or auto-rotative conditions) the aerodynamic damping function will obtain. As the blade 20 hunts about the drag hinge 90 the pitch will be automatically varied in accordance with the desired condition. When the blade moves to the left (as viewed in Fig. 3) the relative position of pivot points 102 and 104 will be changed so as to move the control horn 96 upwardly to increase the pitch of the blade. As the blade drags back or moves to the right, the control horn 96 will be moved downwardly to decrease the pitch of the blade 20. Thus, it may be seen that if the blade drags back due to increased drag, the pitch of the blade will be decreased and will cause a consequent decrease in the drag of the blade and permit the blade to return to a normal position. When the blade moves to the left or leads, the pitch of the blade will be increased to cause the drag to be increased and the blade to return to a normal condition.

The required changes in pitch to attain aerodynamic damping as set forth above are of small degree when compared to the pitch changes required for the various operating conditions which will be imposed upon the blade in accordance with the torque transmitted through the torque responsive device 116. Should the engine fail, the blades would move forward into the auto-rotative or power-off position. Due to the offset position of the pivot points 102, 104 the pitch of the blades would be increased. Such an increase in pitch would be very undesirable since it is required that the blade be in a lower pitch setting in operating under auto-rotative conditions. However, when the engine fails, the overrunning clutch contained within housing 12 permits the blades to continue to rotate but there will no longer be any torque transmitted through the torque responsive device 116. Under these conditions the compression springs will move the spiral splines 324 to their lowermost position and consequently move arms 170 and rod 202 to their lowermost positions. This will act through the control jack 200 and the pitch mechanism to decrease the pitch of the blade. Since the pitch change in response to the torque is much greater than the pitch change in response to the aerodynamic damping function, the net result will be a material decrease in the pitch of the blades. Thus it may be seen that in addition to providing automatic controls for a helicopter and aerodynamic damping of the blades, I have provided a safer helicopter.

Should the pilot desire to trim the pitch setting imposed on the blade by the automatic controls, or should he desire to modify the pitch of the blade in order to perform some abnormal maneuver, manual pitch control means are provided which may override and modify the setting imposed by the automatic control.

It is to be understood that the invention is not limited to the specific embodiment herein illustrated and described, but may be used in other ways without departure from its spirit as defined by the following claims.

I claim:

1. In a helicopter, in combination, an engine driven shaft, a rotor drive shaft, a blade pivotally mounted on said drive shaft for lagging and leading movements in the plane of its rotation and for pitch changes, a blade pitch changing horn on said blade, torque responsive means connecting said shafts, means for increasing blade pitch upon torque increase and decreasing blade pitch upon torque decrease toward an optimum auto-rotational no-torque pitch including linkage means operatively connecting said torque responsive means with said blade horn, said linkage means also including means for decreasing the pitch of said blade as the latter lags back in its plane of rotation and for increasing the pitch thereof as said blade moves forward.

2. In a helicopter, an engine having control means therefor, a drive shaft, a variable pitch blade mounted on said drive shaft for lag-lead movements, pitch control means connected to said blade and including therein means for decreasing the pitch of said blade when lagging and increasing the pitch of said blade when leading, torque responsive means including an element in said shaft for providing movement of said element in response to change in torque, a composite stick having a pivoted end and a free end, a pivot between said ends providing a pivoted end portion, manual means for selectively moving said stick bodily about its pivoted end for controlling said pitch control means or for moving the pivoted end portion only thereof about said intermediate pivot, linkage means for connecting said engine control means with said pivoted end portion, and means connected to said pitch control means for moving the latter in response both to bodily movement of said control stick and movement of said torque responsive means.

3. In a helicopter, an engine having control means therefor, a drive shaft, a variable pitch blade mounted on said drive shaft for lag-lead movements, pitch control means connected to said blade, torque responsive means including an element in said shaft for providing movement of said element in response to change in torque, a composite stick having a pivoted end and a free end, a pivot between said ends providing a pivoted end portion, manual means for selectively moving said stick bodily about its pivoted end for controlling said pitch control means or for moving the pivoted end portion only thereof about said intermediate pivot, linkage means for connecting said engine control means with said pivoted end portion, and means connected to said pitch control means for moving the latter in response both to bodily movement of said control stick and movement of said torque responsive means.

IGOR I. SIKORSKY.

References Cited in the file of this patent

UNITED STATES PATENTS

| Number | Name | Date |
|---|---|---|
| 891,018 | Vawter | June 16, 1908 |
| 1,869,363 | Bard | Aug. 2, 1932 |
| 2,030,578 | Flettner | Feb. 11, 1936 |
| 2,117,788 | Cable et al. | May 17, 1938 |
| 2,209,879 | Focke | July 20, 1940 |
| 2,256,918 | Young | Sept. 22, 1941 |
| 2,322,303 | Martin | June 22, 1943 |
| 2,393,158 | Grace | Jan. 15, 1946 |
| 2,432,320 | Lilley | Dec. 9, 1947 |
| 2,481,032 | Mount et al. | Sept. 6, 1949 |
| 2,569,061 | Hunt | Sept. 25, 1951 |

FOREIGN PATENTS

| Number | Country | Date |
|---|---|---|
| 423,371 | Great Britain | Jan. 31, 1935 |
| 437,521 | Great Britain | Oct. 28, 1935 |
| 467,488 | Great Britain | June 17, 1937 |
| 851,766 | France | Oct. 9, 1939 |